E. F. W. ALEXANDERSON.
SYSTEM OF ELECTRICAL DISTRIBUTION.
APPLICATION FILED JUNE 19, 1911.

1,150,652.

Patented Aug. 17, 1915.
2 SHEETS—SHEET 2.

Witnesses:
Earl G. Klock.
J. Ellis Glen

Inventor:
Ernst F. W. Alexanderson
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

1,150,652.   Specification of Letters Patent.   Patented Aug. 17, 1915.

Application filed June 19, 1911. Serial No. 634,062.

*To all whom it may concern:*

Be it known that I, ERNST F. W. ALEXANDERSON, a citizen of the United States, residing at Schenectady, in the county of Schenectady, State of New York, have invented certain new and useful Improvements in Systems of Electrical Distribution, of which the following is a specification.

My invention relates to systems of electrical distribution and has for its object an improved method and means of utilizing a single phase source of alternating current for supplying a polyphase load.

It is well known that a single phase alternating current may be converted into a polyphase alternating current by means of a suitable phase converter which may be constructed like a polyphase induction motor, one of the phases being connected to the single phase source of supply and the other phase or phases to the polyphase load. Such an arrangement is shown by my previous Patent, No. 901,513, this patent showing various improvements for obtaining a better balancing of the polyphase voltages.

My present invention relates to an improved arrangement for balancing the polyphase voltages in a system employing a phase converter.

I accomplish the object of my invention by connecting one of the phases of the converter to the single phase source of supply and in series with one of the phases of the load, connecting the other phase or if desired the other phases of the converter to another phase or phases of the load, and interpolating into the last mentioned phase circuit or circuits a voltage different in value from that of the source.

The novel features of my invention are pointed out with more particularity in the claims appended to and made a part of this specification.

For a further understanding of my invention, reference may be made to the accompanying drawings, wherein—

Figure 1:
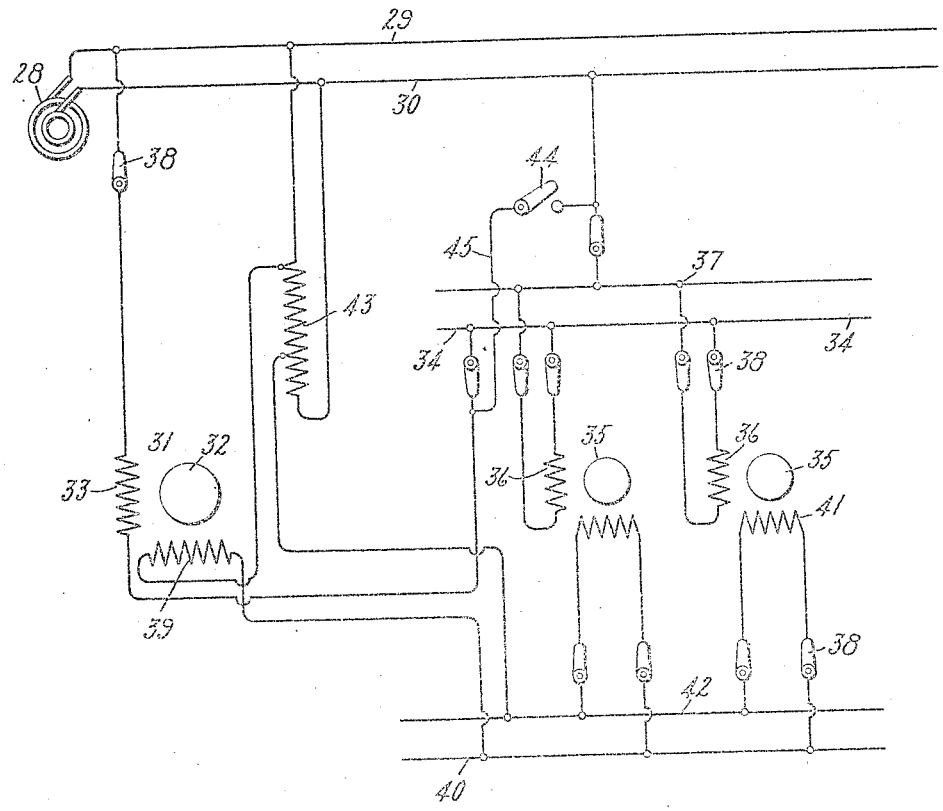
Figure 2:
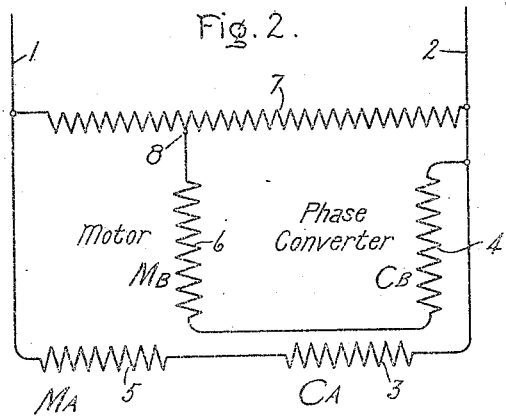
Figure 3:
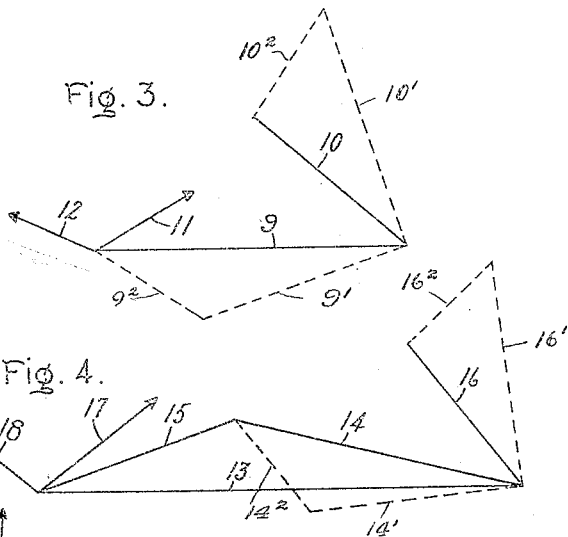
Figure 4:
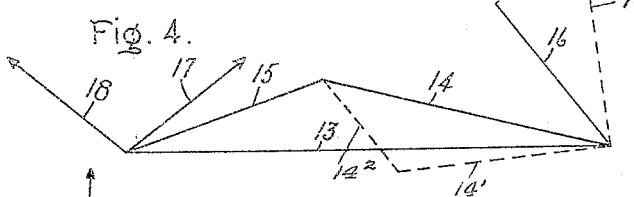
Figure 5:
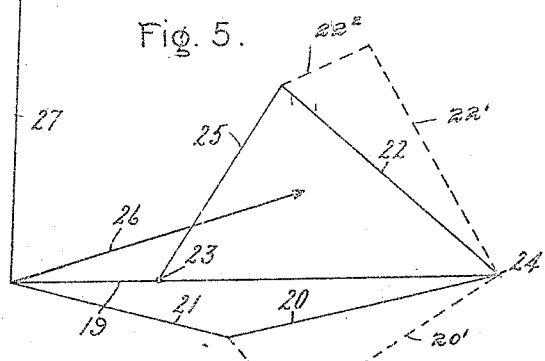

Figure 1 shows diagrammatically my invention applied to the operation of two induction motors; Fig. 2 shows diagrammatically the scheme of connections which I employ, and Figs. 3, 4 and 5 are explanatory vector diagrams.

While my invention may be applied to a polyphase load which may be any form of translating device and of any number of phases, the principles of its operation are most readily understood by considering its application to a two phase or quarter phase load consisting of induction motors, and I shall therefore describe my invention as applied to such, but it will be understood that it may be applied to any form of load of any desired number of phases.

I will first refer to Fig. 2, where I have shown diagrammatically a two-phase induction motor and a two-phase phase converter connected according to my invention. Across the mains 1, 2, supplied with single-phase current from any suitable source, I connect a compensator or transformer 7 and one phase 3 of the primary winding of the phase converter in series with one phase 5 of the primary winding of the induction motor. Associated with the phase 3 is another phase 4 of the primary winding of the converter, which together with the usual secondary winding, not shown, goes to make up a phase converter of any well known type. Similarly, the phase 6 constitutes the other primary winding of a quarter-phase induction motor whose secondary is not shown. The phases 4 and 6 are connected in series between the main 2 and an intermediate point 8 of the compensator 7.

It will be noticed that one of the phases 3 of the converter is connected with the source and in series with one of the phases 5 of the load or induction motor to be operated and that the second phase 4 of the converter is connected to the second phase 6 of the load or induction motor and that preferably into this phase circuit is interpolated a voltage which is a portion of the voltage from the source, this voltage being interpolated in the arrangement shown in this figure by connecting one end of phase 4 of the converter to conductor 2 and by connecting the end of phase winding 6 of the load or induction motor not connected to the converter to point 8 of compensator 7. For convenience of explanation, I shall call phases 3 and 5 of the converter and motor respectively, that are shown as connected in series and directly across conductors 1 and 2 respectively, "converter phase A" and "motor phase A," and phases 4 and 6 respectively "converter phase B" and "motor phase B," designating these on the drawing by $C_A$, $M_A$, and $C_B$, $M_B$, respectively.

The phase converter may be connected in parallel to the load or motors to be operated from the converter. This, however, gives rise to an unbalanced condition of voltages in the different phases as soon as any load is drawn from the converter. This may be seen by referring to Fig. 3, where vector 9 represents the line voltage. Since one of the phases of the converter and one of the phases of the motor are connected in parallel and directly across the line, 9 will also represent the voltage impressed upon these phases of the converter and of the motor, while 9' represents the voltage generated and $9^2$ the voltage drop in this phase of the converter. 10' represents the voltage generated and $10^2$ the voltage drop in the other phase of the converter, while 10 shows approximately the voltage at the terminals of converter phase B and therefore of motor phase B, and, from an inspection of this figure, it will be seen that the voltages at the load or motor terminals 10 and 9 are not balanced, that is, they are not substantially equal in magnitude, and that the angle between them is less than the theoretically correct phase angle of 90°. 11 and 12 show the currents for phase A and phase B, respectively, of the load or motor, and it will be seen that these currents lag behind their voltages 9 and 10. If a winding of the phase converter is connected in series with the load or a winding of the motor supplied by the converter, the voltages are still unbalanced. This condition is shown by Fig. 4, where 13 represents the line voltage. Since converter phase A and motor phase A are connected in series, the voltages across these phases may be represented respectively by 14 and 15, and these voltages will be slightly out of phase with the line voltage and with each other. The voltage generated in converter phase A is represented by 14' and the voltage drop therein by $14^2$. Converter phase B is connected directly to motor phase B, and 16 shows approximately the voltage at the terminals of converter phase B and therefore of motor phase B. The voltage generated in converter phase B is represented by 16' and the drop therein by $16^2$. It will be seen from an inspection of the diagram that the voltages of the load or motor represented by vectors 15 and 16 are also unbalanced. 17 and 18 show respectively the currents in motor phase A and B and it will be seen that these currents lag behind their respective motor voltages 15 and 16. I have, however, found that a much better balancing of the voltages and therefore a better starting torque for a motor load can be obtained by interpolating into the circuit of converter phase B and motor phase B a voltage different in value from that of the source, and I prefer to use a voltage in phase with and derived from the source. The reason why substantially correctly balanced voltages are not obtained without the use of this interpolated voltage, and that therefore the starting torque of the motor is not so great as it should be, is due to the fact that all the lagging current that must be supplied to the phase or phases of the motor, not connected to the source, must be transformed twice by the phase converter passing from the stator to the rotor and back from the rotor to the stator, thereby causing a considerable drop, as may readily be seen. By interpolating a voltage derived from the source into such phase circuit or circuits, as may be desired, so as to create artificially a phase displacement between the output of the phase converter and the input of the motor, the phase converter is allowed to give an output of leading current instead of lagging current, whereas the motor receives lagging current as before. This current flowing in the two machines is the same, but it has the effect of lagging current in one and leading current in the other on account of the artificial phase displacement between the voltages. The result is that the current output of the phase converter is not demagnetizing but tends to increase the voltage, and the voltage and current of the secondary phase can be entirely regulated by selection of a suitable voltage for interpolation in such phase circuit or circuits. This I have found by test, and, in the tests which I have conducted, I have found that, in order to obtain substantially a correct balancing of voltages for a conversion from single phase to quarter phase, a voltage equal to about seventy per cent. of the voltage from the source should be interpolated into this phase circuit. The magnitude of this voltage, however, will depend upon the characteristics of the machines used and the conditions under which they are operated, and therefore the percentage of voltage which I have found will not necessarily be the one which will be suitable for all conditions. Fig. 5 shows the vector diagram for this connection. 19 is the voltage of the source and 20 and 21 respectively converter volts A and motor volts A, these voltages being slightly out of phase with each other and the voltage of the source. The voltage generator in converter phase A is represented by 20' and the drop therein by $20^2$. 22' represents the voltage generated in converter phase B and $22^2$ the drop therein, consequently 22 represents the voltage at the terminals of converter phase B, and the voltage interpolated into the phase circuit B is shown by the portion of 19 between points 23 and 24. 25 will then be the voltage at the terminals of motor phase B, and it will be observed that 25 is substantially equal to and displaced 90° from 21, that is to say, a substantially balanced condition of the voltages for the load or motor is obtained. 26 is the current in phase A and 27 is the current in phase B, and, by referring to the diagram, it will be seen that, while the current 26 in phase A lags behind its voltage 21, the current 27 in phase B lags behind 25, the voltage of motor phase B, but leads 22, the voltage of converter phase B. It will thus be seen that the phase converter gives an output of leading current instead of lagging current, whereas the load or motor receives lagging current as in the previous connections.

Referring now to Fig. 1, I have shown an embodiment of my invention as applied to the operation of two quarter phase induction motors arranged so that either, independently, or both together, may be operated from a single phase converter, but it will be understood that, as I have explained above, any desired number of phases and any desired form of load may be used. 28 is a single phase source to which are connected conductors 29 and 30. 31 is a phase converter of the induction motor type having the short-circuited armature 32 and one of its phase windings 33, converter phase A, connected to conductor 29 and to a conductor 34. 35 are induction motors, two of which I have illustrated as operating in parallel, although it will be understood that any number of motors may be used. Each motor has one of its phase windings 36, motor phase A, connected at one end to conductor 34 and at the other end to conductor 37, which is itself connected by conductor 30 to the source of supply. Suitable switches 38 and 38' may be employed for disconnecting either the motors from the converter or the latter from the source of supply. It will be seen that one of the phases of the converter, converter phase A, is connected to the source and in series with similar phases of the motors, motor phase A, which are themselves connected in parallel by means of conductors 34 and 37. Another phase 39 of the converter, converter phase B, is connected at one end to conductor 29 and at the other end to conductor 40, which is connected to one end of the second phase windings 41 of the motors, motor phase B, the other end being connected to conductor 42, which is connected to a suitable point on compensator 43, which is connected across conductors 29, 30, supplied from the source. It will be seen then that converter phase B is connected to and in series with phase B of the motors, which are themselves connected in parallel, and that, interpolated in this phase circuit, is a voltage of suitable phase and magnitude derived from the source, which voltage I have shown as being a portion of the voltage of the source. It will be understood that, while I have illustrated the connections shown in Fig. 2 as applying in Fig. 1 to the operation of two motors, suitable other connections, whereby an interpolated voltage of the proper phase and magnitude may be obtained, may be employed.

In employing my invention for the conversion of a single phase into a polyphase alternating current, it will be understood that the converter, which I have described as one of the induction motor type, may be started up before its load is put on in any of the well known ways for starting such polyphase machines from a single phase source. After the converter is at its running speed, it may be operated as a single phase machine and the load may then be connected to it in any suitable fashion. As shown in the figure, the converter is connected to two motors. If it be desired to disconnect these, switches 38 will be opened and switch 44 closed, thus connecting winding 33 of the converter by means of a conductor 45 across conductors 29 and 30. The converter will then be running light. Any of the well known forms of interlock between any of switches 38 and 44 may be employed if desired.

While I have described a preferred embodiment of my invention, I do not limit myself to such embodiment but seek in the appended claims to cover all embodiments which may be obvious to those skilled in the art and do not depart from the spirit of my invention.

What I claim as new and desire to secure by Letters Patent of the United States, is,—

1. In combination, a single phase source, a polyphase translating device, a phase converter having a phase connected to a phase of said translating device, and means for interpolating into said phase circuit a voltage different in value from that of said source, said phase converter having another phase connected to said source and in series with another phase of the translating device.

2. In combination, a single phase source, a polyphase translating device, a phase converter having a phase connected to a phase of the translating device, and means for interpolating into said phase circuit a voltage different in value from that of said source but in phase therewith, said phase converter having another phase connected to the source and in series with another of the phases of the translating device.

3. In combination, a single phase source, a translating device, a phase converter having a phase connected to a phase of said translating device, and means for deriving from said source and interpolating into said phase circuit a voltage different in value from that of said source, said converter having another phase connected to said source and in series with another phase of said translating device.

4. In combination, a single phase source, a translating device, a phase converter having a phase connected to a phase of said translating device, and means for deriving from said source and interpolating into said phase circuit a voltage different in value from that of said source but in phase therewith, said converter having another phase connected to said source and in series with another phase of said translating device.

5. In combination, a single phase source, means for deriving a voltage therefrom proportional to that of said source, a polyphase translating device, and a phase converter having one phase connected to said source and in series with one of the phases of said translating device and having another phase connected to another phase of the translating device and to said means.

In witness whereof, I have hereunto set my hand this 16th day of June, 1911.

ERNST F. W. ALEXANDERSON.

Witnesses:
   BENJAMIN B. HULL,
   MARGARET E. WOOLLEY.